United States Patent [19]

Schaller

[11] Patent Number: 5,597,483
[45] Date of Patent: Jan. 28, 1997

[54] VENTED BAFFLE SYSTEM

[75] Inventor: Earle Schaller, Palm Beach Gardens, Fla.

[73] Assignee: NEFCO Inc., Palm Beach Gardens, Fla.

[21] Appl. No.: 374,328

[22] Filed: Jan. 18, 1995

[51] Int. Cl.$^6$ ................................................. B01D 21/24
[52] U.S. Cl. ........................... 210/232; 210/528; 210/539; 210/540; 210/541; 220/660
[58] Field of Search .................................... 210/232, 513, 210/521, 525, 528, 532.1, 538, 539, 540, 541, 136; 220/4.12, 565, 660; 29/897, 897.3; 52/745.05, 745.2, 748

[56] References Cited

U.S. PATENT DOCUMENTS

| | | | |
|---|---|---|---|
| 707,567 | 8/1902 | Edson | 210/136 |
| 2,150,157 | 3/1939 | Franklin . | |
| 2,422,394 | 6/1947 | Carter, Jr. | 210/539 |
| 2,790,372 | 4/1957 | Cooper . | |
| 2,826,306 | 3/1958 | Burns | 210/539 |
| 3,184,065 | 5/1965 | Bradford | 210/539 |
| 3,849,311 | 11/1974 | Jakubek | 210/539 |
| 4,109,433 | 8/1978 | Maze | 52/199 |
| 4,202,778 | 5/1980 | Middelbeek | 210/539 |
| 4,391,704 | 7/1983 | Anderson | 210/188 |
| 4,531,455 | 7/1985 | Palmer | 98/96 |
| 4,706,418 | 11/1987 | Stewart | 52/58 |
| 4,710,292 | 12/1987 | DeVos | 210/539 |
| 4,758,339 | 7/1988 | Vellinga | 210/539 |
| 4,767,536 | 8/1988 | Roley | 210/188 |
| 4,899,505 | 2/1990 | Williamson et al. | 52/199 |
| 5,139,657 | 8/1992 | Nojima et al. | 210/521 |
| 5,252,205 | 10/1993 | Schaller | 210/232 |
| 5,286,392 | 2/1994 | Shea | 210/793 |

Primary Examiner—Christopher Upton
Attorney, Agent, or Firm—Sofer & Haroun, LLP

[57] ABSTRACT

A vented baffle system for use in a clarifier tank having a tank bottom, a periphery and a substantially vertical peripheral wall bounding the interior of the tank is formed by a plurality of individual and cooperatively-engageable baffles mounted on the peripheral tank wall. Each baffle includes a panel member that downwardly slopes from the peripheral tank wall toward the interior of the tank and the tank bottom and terminates at a lower edge disposed in space relation above the tank bottom. A first lateral end of the panel member unitarily carries an end bracket securable to the peripheral wall for supporting the panel member in a cantilevered fashion. One or more of the baffles are provided with a relief valve means for venting the pressure in a space formed between the junction of the lower side of the panel member and the peripheral tank wall. The resulting system provides a vented baffle system in which pressure exerted by the build up of gases in the space may be alleviated.

7 Claims, 4 Drawing Sheets

5,597,483

VENTED BAFFLE SYSTEM

FIELD OF THE INVENTION

This invention relates generally to a vented baffle and vented baffle system for use in a solids-precipitating clarifier tank, the baffle system consisting of a plurality of interengaged individual vented baffles secured to the clarifier tank peripheral wall.

BACKGROUND OF THE INVENTION

The present invention relates generally to a baffle in a clarifier tank for gravitationally separating solids suspended in a liquid contained in the tank. These baffle devices are also known in the art as a lamella gravity separator or settler. The clarifiers with which the inventive baffle device is used typically consist of a circular or rectangularly-configured tank in which a centrally mounted, radially-extended arm is slowly moved or rotated about the tank at or proximate the surface of the carrier liquid. For a more detailed description of the individual non-vented baffle and non-vented baffle system, U.S. Pat. No. 5,252,205 to Schaller is referred to and hereby incorporated by reference.

The present invention provides a vented baffle that is mounted in cantilevered fashion along a peripheral wall of the clarifier intermediate the tank bottom and the surface of the carrier liquid contained in the tank. The vented baffle system includes a plurality of such baffles which are constructed as modular units and form a continuous, single-surface sheet that slopes downwardly from the peripheral tank wall toward the center of the tank and terminates at a free edge suspended in spaced relation above the tank bottom. More specifically, each panel member which is downwardly sloping from the peripheral tank wall toward the interior of the tank and the tank bottom, is provided with a lower side and an upper side. The panel member extends downwardly from an upper edge secured to the peripheral tank wall to a lower edge disposed in spaced relation to the tank bottom. The panel member has a first lateral side and a second lateral side with the panel member defining a space formed between the junction of the lower side of the panel member and the peripheral tank wall. Due to the inclined configuration of these baffles, air may be trapped during the filling of the tank in a space formed between the junction of the lower side of the panel member and the peripheral tank wall. As well other gases which may form naturally as a part of the chemical processes which take place within the clarifier may be trapped in this space. Accordingly, the forces imposed by these gases on the baffle require that the baffle be constructed and mounted in such a manner that will withstand these forces. As well, the build up of pressure from these gases can be extreme with damage and/or personal injury resulting unless some form of venting is provided.

A common form of venting relies on one or more holes drilled in the baffle panel member to continually vent the gas to the surface and alleviate the build up of pressure. Small holes (1 inch diameter or less) however rapidly become clogged with sludge and become ineffective. Larger holes allow the continual upflow of waste solids and can create a negative impact on the performance of the baffle.

Numerous clarifier and baffle configurations are disclosed in the art. However, prior art attempts have suffered from a variety of various drawbacks and deficiencies.

For example, in U.S. Pat. No. 4,109,433 to Maze relates to a ventilator for spaces under slanted roofs or attics such as a gable, hip and shed roof types. Specifically, the ventilator uses an elongate duct positioned between the adjacent rafters under a roof. However, there is no disclosure in the reference of an improved vented baffle system which is constructed as a modular unit and that consists of a plurality of interengaged individual baffles, each formed as a unitarily-integrated element incorporating the panel member, a vent means and an integral end bracket for suspended securement of the baffle to the peripheral wall of the clarifier tank.

U.S. Pat. No. 5,286,392 to Shea is directed to a launder and baffle structure used in association with a filtration tank of which the type using granular filtration media is disclosed. Specifically, a regulable air discharge system is disclosed to release a selected amount of air from beneath the baffle system in order to regulate turbulence and thereby facilitate quiescence of flow. This reference, however, does not teach an improved vented baffle system having a plurality of baffles with each baffle consisting of unitarily-integrated design incorporating a panel member, an end bracket for cantilevered securement of the baffle to the peripheral wall and a relief valve means which is in fluid communication with the space formed between the junction of the lower side of the panel member and the peripheral tank wall preventing the pressure in said space.

It is, therefore, an object of the present invention to provide a system of plural integrated vented baffles, curved to match the peripheral contour of a circular or arcuate tank or, alternatively, linear to match the peripheral walls of a non-circular tank, and which interlock to form a rigid "shelf" or baffle system inclined inward and downward around the entire periphery of the tank.

Another object of the invention is to provide a relief valve means in fluid communication with the space formed between the junction of the lower side of the panel member and the peripheral tank wall preventing the pressure in the space.

A further object of the invention is to provide a relief valve means which opens and closes dependent on the pressure exerted by the gas pressure in the space.

Another object of the invention is to provide a relief valve means which is located between the substantially vertical peripheral wall and the panel member so that venting of gases may be accomplished.

Another object of the invention is to provide a relief conduit passage in fluid communication with the space formed between the junction of the lower side of the panel member and the peripheral tank wall preventing the pressure in the space and which is integrally molded into the mounting flange.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

In accordance with the invention, a vented baffle system formed of a plurality of individual baffles, for use in a clarifier tank, is provided. The vented baffle system includes a plurality of interengaged individual baffles with each baffle having a unitarily integrated design incorporating a panel member, an end-depending mounting bracket, and a relief valve means such as a relief valve, diaphragm or conduit. The panel member slopes downwardly from the peripheral tank wall toward the tank bottom and defines a first lateral side end and a second lateral side end. The end bracket is integrally arranged at the first side end for securing the panel member to the radially inwardly facing peripheral wall of the clarifier tank. The second side end of each baffle is configured for preferably interlocked securement to the first side end of a next adjacently-located one of the plural baffles. In this way the inventive vented baffle system, which is mounted in cantilevered fashion along the peripheral wall of the clarifier intermediate the bottom of the tank and the surface of the contained liquid in the tank, forms a continuous single-surface sheet or "shelf" that slopes downwardly from the peripheral tank wall toward the center of the tank and terminates at a free edge suspended in spaced relation above the tank bottom.

The panel member can be further provided with a supplemental mounting flange along the top or upper edge of the member. The supplemental mounting flange may be unitarily formed along the upper edge of the panel member to thereby provide additional support and securement of the panel member to the peripheral wall of the clarifier tank. The panel member may also or alternatively be provided with a unitarily-integral rigidizing flange depending from and extending along the lower edge of the panel member for providing additional structural strength thereto, particularly along the rigidizing flange, which serves as a stiffening member for the lower, only indirectly supported portion of the panel member. The rigidizing flange also contributes to deflection of density currents and redirection of liquid flow back into the central volume of the tank.

Referring to the venting structure or relief valve means, a relief valve, diaphragm or conduit is provided near the top of each baffle panel. When a relief valve is employed, the valve opens when the pressure exerted by the build up of gas reaches a predetermined level. The relief valve may be round or rectangular in shape. For example, the valve may consist of a housing which is mounted in a hole or slot cut into the baffle panel. The relief valve means may also be a diaphragm made from neoprene or other suitable material which is impervious to the submerged waste water environment. In one form, the diaphragm, itself, is stiff and provides the necessary force to resist opening until the appropriate pressure is reached. In another embodiment, the diaphragm is spring loaded and the spring provides the necessary force to resist opening until the proper pressure is reached. Thereafter, the spring biased relief valve is closed.

In a further embodiment, one or more venting conduits or passages may be provided which are unitarily integrated in the mounting flange. In this way, the venting conduits or passages provide continuous venting of the pressure in the space formed between the junction of the lower side of the panel member and the peripheral tank wall thereby alleviating the build up of pressure. If mounting flanges are not utilized, conduits or passages may be employed in the panel member.

Thus, the vented baffle system of the present invention can be mounted in a cantilevered fashion along the peripheral wall of the clarifier tank intermediate the bottom of the tank and the surface level of the contained liquid in the tank and forms a continuous, single-surface sheet that slopes downwardly from the peripheral tank wall toward the center of the tank and terminates at a free edge suspended outwardly from the peripheral wall and in spaced relation above the tank bottom.

In a currently preferred implementation, the individual vented baffles are fabricated from a molded reinforced fiberglass composite as one-piece, unitarily-integrated units. Thus, each molded baffle incorporates the panel member, the end bracket, the optional mounting flange and optional stiffeners in a single unit that, advantageously, enables significant reductions both in manufacturing time and for installation as compared to other, prior art arrangements and systems. As well, the unitarily integrated units may incorporate the vent means as described above. For example, the baffles may incorporate conduits on the mounting flange or have holes or cut outs that are suitable for the insertion of relief valve means such as diaphragms, relief valves or the like. Most preferably, the thickness of the fiberglass panels is in the range of from about 3/16th to 1/4th of an inch, a range that provides substantial structural strength and rigidity while remaining sufficiently lightweight for unusual ease of installation.

A method of installing a system of interengaging vented baffles for use in a clarifier tank is also disclosed. The system includes at least a first vented baffle and a second baffle that may or may not be vented. Both first and second baffles are mountable in the clarifier tank. The first baffle is placed along the inner surface of the peripheral wall of the tank with the first baffle having a panel member sloping downwardly from the peripheral wall toward the tank bottom and an integral end bracket. Both panel members, have a first lateral side end —from which the bracket depends—and a second lateral side end. As the second baffle is placed adjacent to and for interengagement with the first baffle along the peripheral wall of the clarifier, the second lateral side end of the adjacent second baffle engages the first side end of the first baffle and thus forms an integrated, substantially rigid peripheral single-shelf baffle system. As the first baffle is vented, pressure build-up in the space formed between the junction of the lower side of the panel member and the peripheral tank wall is alleviated.

The invention accordingly describes the features and method of construction, the combination of elements and the arrangements of parts which will be exemplified in the embodiments hereinafter set forth, the scope of the invention being indicated by the appended claims.

BRIEF DESCRIPTION OF THE DRAWINGS

In the drawings, wherein like reference numerals denotes similar elements throughout the several views.

DESCRIPTION OF THE PRESENTLY PREFERRED EMBODIMENTS

A baffle system constructed in accordance with the present invention for use in a clarifier tank includes a plurality of interengaged, individual vented baffle members. One or more of each vented baffle member has a downwardly sloping panel member which slopes from the peripheral tank wall toward the interior of the tank and the tank bottom, with the panel member having a lower side and an upper side. The panel member extends downwardly from an upper edge secured to the peripheral tank wall to a lower edge disposed in space relation to the tank bottom. The panel member has a first lateral side and a second lateral side, with the panel member defining a space formed between the junction of the lower side of the panel member and the peripheral tank wall. As well, each baffle has an end bracket for securement of the baffle to the peripheral wall of the clarifier tank. The end bracket includes a ship lap-type recess for receiving the opposite lateral end of the next-adjacent baffle member unit and thereby provides a smoothly continuous connection with the adjacently-disposed panel.

The baffle also utilizes a relief valve means mounted in the panel member which is in fluid communication with the space formed between the junction of the lower side of the panel member and the peripheral tank wall. In this way, the relief valve means provides venting of the pressure in the space between the junction of the lower side of the panel member and the peripheral tank wall.

Figure 1:
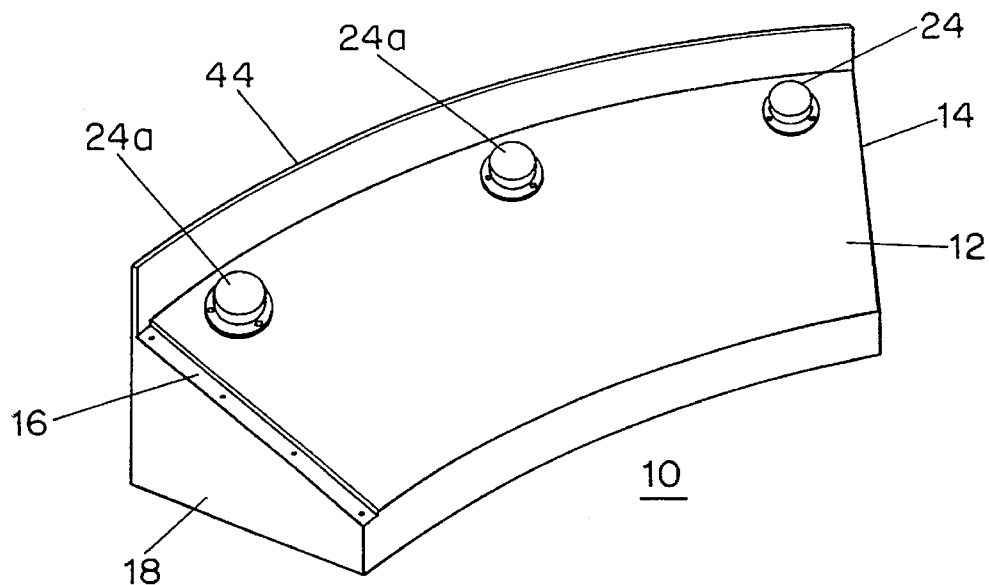
FIG. 1 is an elevated prospective view of a unitarily integrated vented baffle member showing a diaphragm constructed in accordance with the teachings of the present invention.
Figure 2:
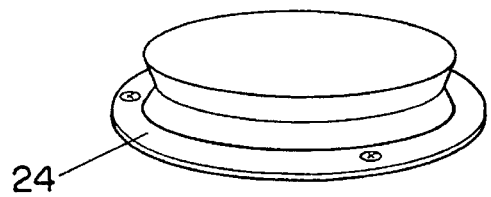
FIG. 2 is a side view of the diaphragm as shown in FIG. 1.
Figure 3:
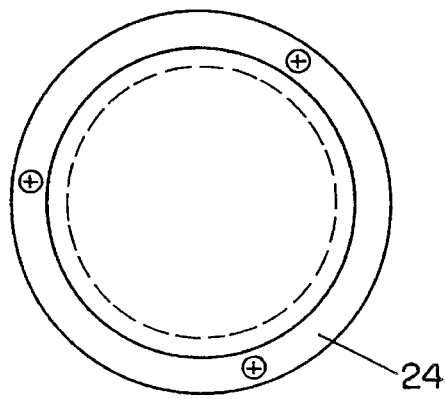
FIG. 3 is a top view of the diaphragm as shown in FIGS. 1 and 2.

Referring specifically to FIG. 1 of the drawings, a preferred embodiment of a baffle member 10 in accordance with the invention includes a smoothly planar, downwardly sloping surface panel member 12 having a first side lateral end 14 and a second lateral side end 16. The baffle 10 carries an end bracket 18, integrally depending from and, in the most preferred form, unitarily fabricated on the second end 16 of the panel member 12 for securing the panel to the radially inward facing surface of the peripheral wall 20 of a clarifier tank 22 (see FIGS. 8 and 9). The second or opposite end 16 of the baffle 10 is adopted for securement to the end bracket 18 of a next-adjacent baffle member when a plurality of such baffles are interconnectedly engaged, as hereinafter described, to form a vented baffle system in accordance with the invention and, for that purpose, may have one or a plurality of bores defined there through for receiving rivets or the like fasteners attaching the adjacent baffles one to the other. Also as shown in FIG. 1, the baffle 10 also includes relief valve means 24 such as a diaphragm 24a which is provided near the top of each panel member 12.

Referring to FIGS. 1, 2, 3 and 8, when diaphragm 24a is provided, the diaphragm 24a itself, is stiff and provides the necessary force to resist opening until the appropriate pressure is reached. The diaphragm 24a may be positioned on the upper portion of the panel member 12. Typically, a hole or slot (not shown) is cut into the panel member 12. In this way, the diaphragm 24a may be inserted into the hole or slot of the panel member 12.

Figure 8:
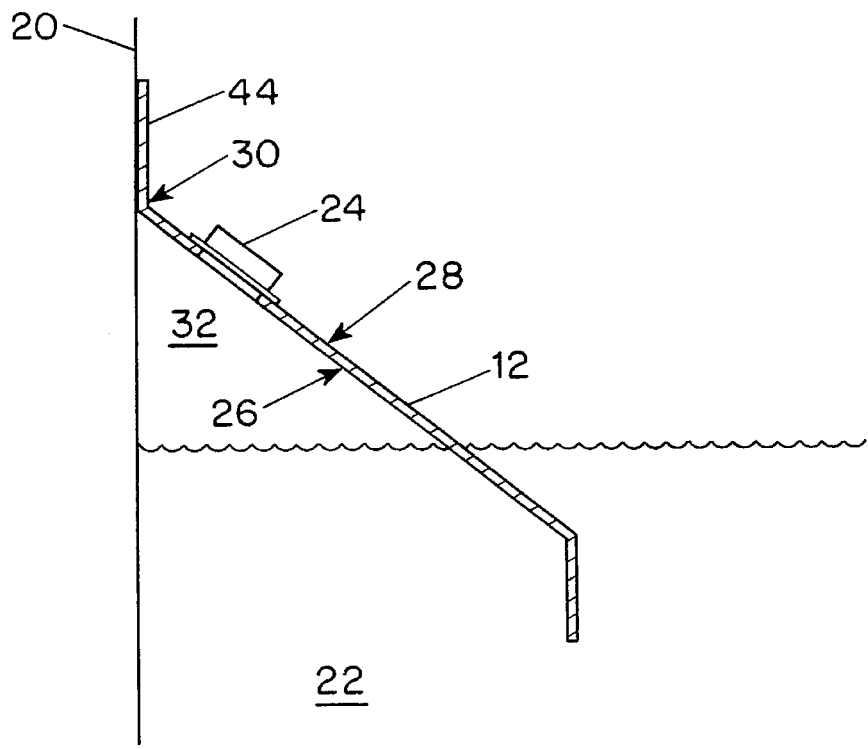
FIG. 8 is a cross-sectional view of the vented baffle member and diaphragm shown in FIGS. 1, 2 and 3.

Referring to FIG. 8, the panel member 12 is shown as downwardly sloping from the peripheral tank wall 20 toward the interior of the tank 22 and the tank bottom (not shown). The panel member 12 has a lower side 26 and an upper side 28. The panel member 12 extends downwardly from an upper edge 30 which optionally may be secured to the peripheral tank wall 20 with a mounting flange. By mounting the baffle member 10 in this fashion, the panel member 12 defines a space 32 formed between the junction of the lower side of the panel member 26 and the peripheral tank wall 20.

As shown in FIG. 8, the diaphragm 24a is mounted in the panel member 12 and is in fluid communication with the space 32 located between the junction of the lower side 26 of the panel member 12 and the peripheral tank wall 20 for venting the pressure in the space 32. Preferably, the diaphragm 24a is fabricated from neoprene or other suitable material which is impervious to the submerged waste water environment. In one form, the diaphragm 24a, itself, is stiff and provides the necessary force to resist opening until the appropriate pressure is reached. Accordingly, the diaphragm 24a is positionable in a first open position when the pressure exerted by the build up of gas reaches a predetermined level and positionable in a second closed position when the pressure exerted by the build up of gas reaches a second predetermined level.

Figure 4:
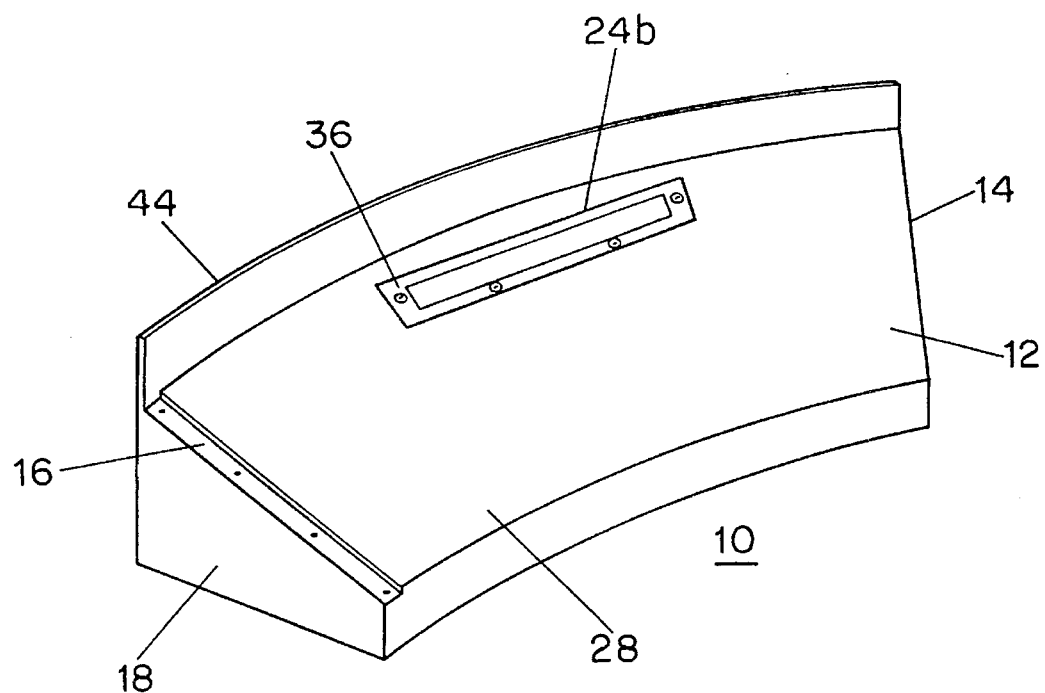
FIG. 4 is an elevated prospective view of a unitarily integrated vented baffle member showing a relief valve constructed in accordance with a further embodiment of the present invention.
Figure 5:
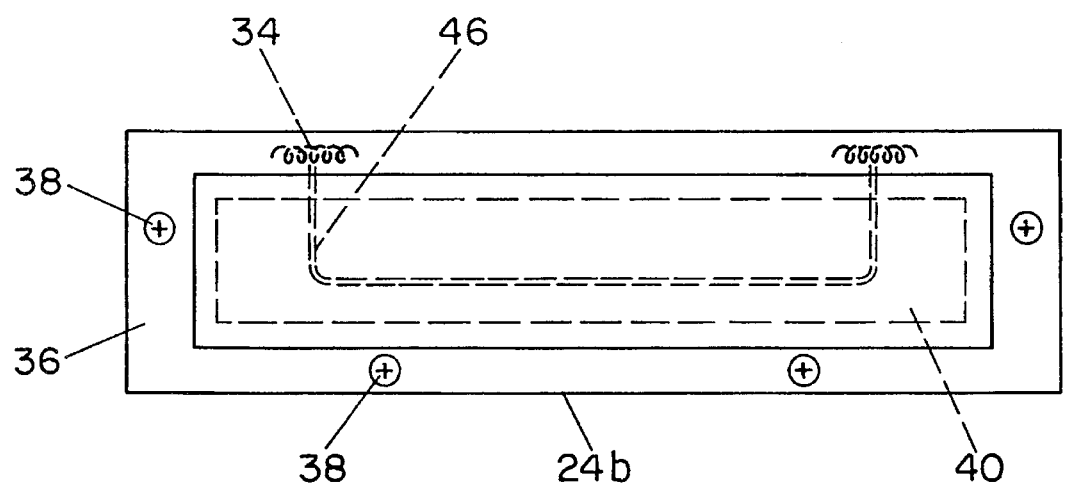
FIG. 5 is a top view of the relief valve as shown in FIG. 4.

A further embodiment of the relief valve means 24 is shown in FIGS. 4 and 5. Specifically, the panel member 12 is also shown as downwardly sloping from the peripheral tank wall 20 toward the interior of the tank 22 and the tank bottom (not shown). Similar to the embodiment shown in FIG. 1, the panel member 12 has a lower side 22 and an upper side 28. A relief valve 24b is mounted in the panel member 12 and is in fluid communication with the space 32 located between the junction of the lower side 26 of the panel member 12 and the peripheral tank wall 20 preventing the pressure in the space 32. Preferably, the relief valve 24b is spring loaded via a spring mechanism 34 and is attached to a guide wire 46. Accordingly, the spring mechanism 34 and guide wire 46 provide the necessary force to resist opening until the proper pressure is reached. Thereafter, the spring biased relief valve 24b is closed.

As shown in FIG. 5, the spring biased relief valve 24b consists of a housing 36 which is mounted in a hole or slot (not shown) cut into the panel member 12. Securement of the housing 36 to the panel member 12 is provided with rivets, fasteners, screws or the like 38. In this way, flap 40 may be positionable in both a first open position and a second closed position depending on the pressure in space 32.

Figure 6:
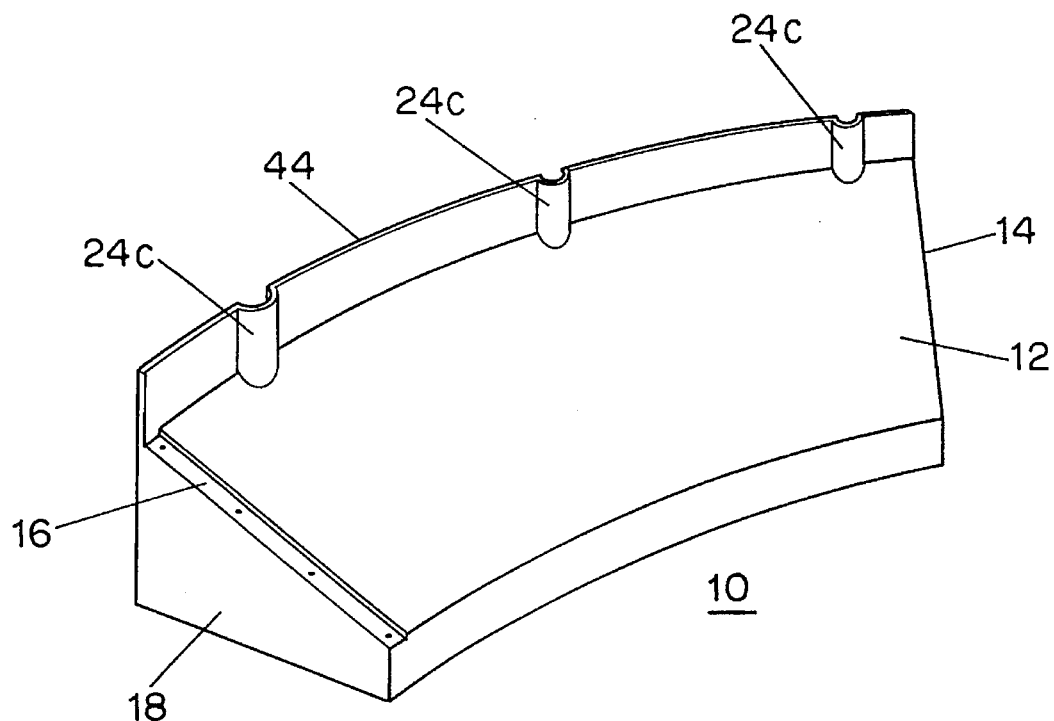
FIG. 6 is an elevated prospective view of a unitarily integrated vented baffle member showing a vent conduit constructed in accordance with a further embodiment of the invention.
Figure 7:
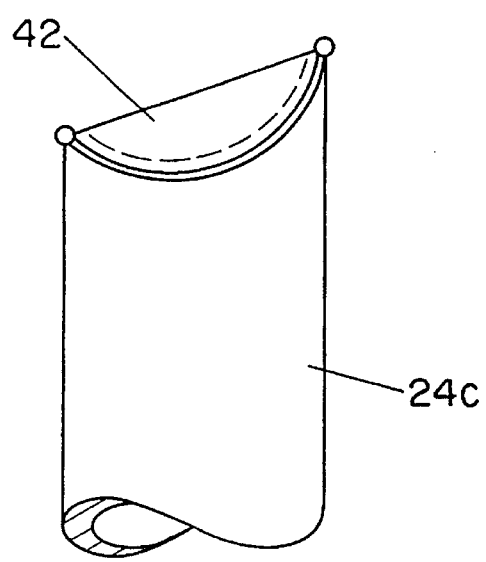
FIG. 7 is a side view of the vent conduit as shown in FIG. 6 with a relief valve mounted thereon.
Figure 9:
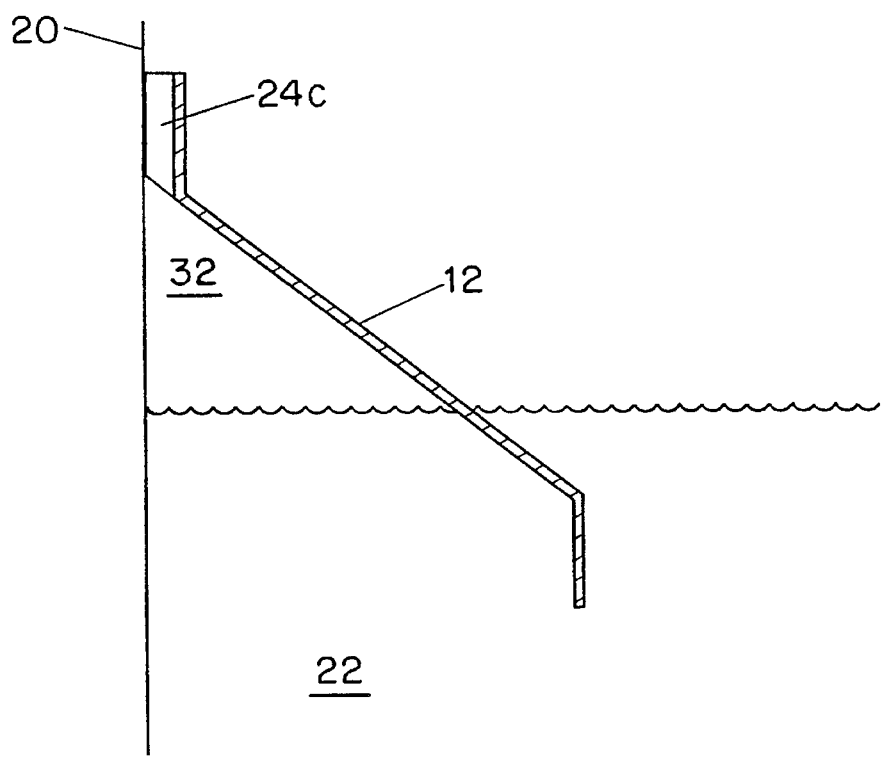
FIG. 9 is a cross-sectional view of the vented baffle and vent conduit as shown in FIGS. 6 and 7.

Referring to FIGS. 6, 7 and 9 a further embodiment of the relief valve means 24 is shown specifically, a relief conduit 26c which is provided near the top of the panel member 12. When such a relief conduit 24c is employed, the conduit 24c vents the pressure exerted by the buildup of gas which accumulates in the space 32 formed between the junction of the lower side of the panel member 26 and the peripheral tank wall 20. Accordingly, the conduit 24c is in fluid communication with the space 32 located between the junction of the lower side 26 of the panel member 12 and the peripheral tank wall 20 for venting the pressure in the space. Optionally, the relief conduit 24c may be provided with a venting flap 42. This venting flap 42 is positionable in a first open position when the pressure exerted by the buildup of gas reaches a predetermined level and positionable in a second closed position when the pressure exerted by the buildup of gas reaches a second predetermined level. One or more relief conduits 24c may be provided with each baffle member 10.

Preferably and as understood by one skilled in the art, the relief conduit 24c may be integrally molded in the mounting flange 44. In this way, the venting conduits 24c provide continuous venting of the pressure in the space 32 formed between the junction of the lower side of the panel member and the peripheral tank wall thereby alleviating the buildup of pressure in the space 32.

The vented baffle system of the present invention is formed using a plurality of the individual vented baffle members and as will now be described with reference, by way of example, to FIG. 1. As should be apparent, the first plural members are interconnected and attached in an end-to-end arrangement so that the panels 12 form a smoothly continuous downwardly and inwardly (i.e. toward the center or central portion of the clarifying tank 22) sloping surface. The panel defined sloping surface extends outwardly from the peripheral tank wall 20, to which the baffle members 10 are supportedly mounted, toward the tank bottom and terminates in and in spaced relation at a suitable distance from the tank bottom. Thus, the baffle members 12 define a cantilevered surface supported through direct securement at its top to the tank wall 20 and through indirect attachment, by way of the end brackets 18 at intervals along the sloping surface as defined by the lateral ends of the panel members 10. As should be further apparent, the individual baffle members 10 are additionally secured to the clarifier tank wall, as by rivets or screws or other fasteners or the like, at and through the mounting flange 44 and, when optionally present, a supplemental flange (not shown). As described above, suitable vent relief means 24 may be employed on one or more of the individual baffles in order to provide the vented baffle system.

It should be understood that the preferred embodiments and examples described are for illustrative purposes only and are not to be construed as limiting the scope of the present invention which is properly delineated only in the appended claims.

What is claimed is:

1. A baffle in a clarifier tank for gravitationally separating solids suspended in a liquid contained in the tank, the clarifier tank having a tank bottom and a substantially vertical peripheral wall bounding the liquid contained in the tank, the clarifier tank having a tank bottom and a substantially vertical peripheral wall bounding the liquid-containing interior of the tank, said baffle comprising:

a panel member downwardly sloping from the peripheral tank wall toward the interior of the tank and the tank bottom, said panel member having a lower side and an upper side, said panel member extending downwardly from an upper edge to a lower edge disposed in a spaced relation to the tank bottom said panel member having a first lateral side and a second lateral side, said panel member defining a space formed between the junction of the lower side of the panel member and the peripheral tank wall;

an end bracket for securement with said first lateral side of said panel member for supportingly securing said panel member to the peripheral wall of the clarifier tank;

a mounting flange integrally extending from said upper edge of said panel member and secured to the peripheral wall for securing said panel member to the peripheral wall of the clarifier tank, said mounting flange provided with an upper edge; and a relief conduit integrally molded into said mounting flange and in fluid communication with said space formed between the junction of the lower side of the panel member and the peripheral tank wall for venting the pressure in said space, said relief conduit having a first inlet end proximate said upper edge of said panel member and a second outlet end proximate said upper edge of said mounting flange.

2. The baffle system of claim 1, wherein the peripheral wall of the clarifier tank has a radius of curvature, and wherein said panel member upper edge has a radius of curvature which corresponds to the radius of curvature of the clarifier tank.

3. The baffle system of claim 1, each said baffle further comprising a rigidizing flange unitarily depending from said lower edge of said panel member for providing enhanced rigidity to said panel member.

4. The baffle system of claim 1, wherein said end bracket further comprises a mounting flange securable to the peripheral tank wall in surface-to-surface engagement for securing said end bracket to the peripheral wall, and a mounting surface for receiving the first lateral side of the panel member of a next-adjacent one of said plural baffles so as to secure together adjacent ones of said baffles in end-to-end relation.

5. The baffle system of claim 1, wherein said panel member defines a smoothly continuous plane and said mounting surface of said end bracket is recessed from said plane so that when the first lateral side of a panel member of one of said plural baffles is secured to said end bracket of a next-adjacent one of said plural baffles, the panel members of said one and next-adjacent baffles together form a smoothly-continuous downwardly, sloping surface.

6. The baffle system of claim 1, wherein the peripheral wall of the clarifier tank has a radius of curvature, wherein said panel member has an upper edge, and wherein said panel member upper edge has a radius of curvature which corresponds to the radius of curvature of the clarifier tank.

7. The baffle system of claim 1, wherein said baffle is molded as a one-piece unit of a reinforced fiberglass composite.

* * * * *